United States Patent
Xie et al.

(10) Patent No.: US 12,040,481 B2
(45) Date of Patent: Jul. 16, 2024

(54) GRAPHENE AND NETWORK FORMER-MODIFIED VANADIUM PENTOXIDE SILICON DIOXIDE CATHODES FOR LITHIUM-ION BATTERIES

(71) Applicant: The Trustees of Indiana University, Bloomington, IN (US)

(72) Inventors: Jian Xie, Carmel, IN (US); Yadong Liu, Indianapolis, IN (US)

(73) Assignee: The Trustees of Indiana University, Bloomington, IN (US)

( * ) Notice: Subject to any disclaimer, the term of this patent is extended or adjusted under 35 U.S.C. 154(b) by 519 days.

(21) Appl. No.: 17/416,670

(22) PCT Filed: Dec. 19, 2019

(86) PCT No.: PCT/US2019/067593
§ 371 (c)(1),
(2) Date: Jun. 21, 2021

(87) PCT Pub. No.: WO2020/132312
PCT Pub. Date: Jun. 25, 2020

(65) Prior Publication Data
US 2022/0077454 A1 Mar. 10, 2022

Related U.S. Application Data (60) Provisional application No. 62/784,059, filed on Dec. 21, 2018.

(51) Int. Cl.
*H01M 4/36* (2006.01)
*H01M 4/38* (2006.01)
*H01M 4/48* (2010.01)
*H01M 4/62* (2006.01)
*H01M 10/052* (2010.01)

(52) U.S. Cl.
CPC .......... *H01M 4/364* (2013.01); *H01M 4/382* (2013.01); *H01M 4/483* (2013.01); *H01M 4/625* (2013.01); *H01M 10/052* (2013.01)

(58) Field of Classification Search
CPC .... H01M 4/134; H01M 4/1395; H01M 4/364; H01M 4/382; H01M 4/483; H01M 4/62; H01M 10/052; H01M 2004/028
See application file for complete search history.

(56) References Cited

U.S. PATENT DOCUMENTS

| 4,675,260 | A | 6/1987 | Sakurai et al. |
| 5,674,642 | A | 10/1997 | Le et al. |
| 9,346,680 | B2 | 6/2016 | Liu |
| 2011/0033746 | A1 | 2/2011 | Liu et al. |

(Continued)

OTHER PUBLICATIONS

International Preliminary Report on Patentability received for PCT Patent Application No. PCT/US2019/067593, mailed on Jul. 1, 2021, 9 pages.

(Continued)

*Primary Examiner* — Scott J. Chmielecki
(74) *Attorney, Agent, or Firm* — Hartman Global IP Law; Gary M. Hartman; Domenica N.S. Hartman (57) ABSTRACT

An improved nanocomposite cathode material for lithium-ion batteries comprising vanadium pentoxide substrates with a conductive matrix of graphene sheets and a network former such as silicon dioxide and a method of making the same.

20 Claims, 9 Drawing Sheets

(56) References Cited

U.S. PATENT DOCUMENTS

| | | | |
|---|---|---|---|
| 2011/0051316 A1* | 3/2011 | Liu | H01M 4/92 |
| | | | 428/319.1 |
| 2012/0321953 A1 | 12/2012 | Chen et al. | |
| 2015/0380732 A1* | 12/2015 | Xie | H01M 4/131 |
| | | | 427/126.3 |

OTHER PUBLICATIONS

Rozhok et al., "AFM Study of Water Meniscus Formation between an AFM Tip and NaCl Substrate", J. Phys. Chem. B, vol. 108, 2004, pp. 7814-7819.

International Search Report and Written Opinion issued by the International Searching Authority, dated Feb. 28, 2020, for International Patent Application No. PCT/US2019/67593; 10 pages.

Zhang, et al. "V2O5-SiO2 hybrid as anode material for aqueous rechargeable lithium batteries, ionics", Apr. 6, 2016, retrieved on Feb. 7, 2020, http://www.brunogpollet.com/wp-content/uploads/2013/09/V2O6-SiO2-hybrid-as-anode-material-for-aqueous-rechargeable.pdf; 9 pages.

* cited by examiner

GRAPHENE AND NETWORK FORMER-MODIFIED VANADIUM PENTOXIDE SILICON DIOXIDE CATHODES FOR LITHIUM-ION BATTERIES

CROSS REFERENCE TO RELATED APPLICATION

RELATED APPLICATIONS

This application is a national stage entry of International (PCT) Patent Application No. PCT/US19/67593, filed Dec. 19, 2019 which in turn claims priority to U.S. Provisional Application No. 62/784,059, filed Dec. 21, 2018, the disclosures of which are hereby expressly incorporated by reference herein in their entirety.

FIELD OF THE DISCLOSURE

The present disclosure relates generally to lithium-ion (Li-ion) batteries and, more particularly, to graphene and network former-modified vanadium pentoxide silicon dioxide ($V_2O_5$—$SiO_2$) cathodes for Li-ion batteries.

BACKGROUND OF THE DISCLOSURE

Since the introduction of Li-ion batteries, the demand for increasingly higher specific capacity and specific energy batteries has steadily increased with the advance of portable electronics, electric vehicles (EVs), hybrid electric vehicles (HEVs) and the like. Likewise, the need for alternative fuel sources has grown over the last decades, due to such factors as the rise of oil prices, the increase in global population, and the pollution generated by internal combustion vehicles. As world population continues to grow, so will the number of vehicles and the demand for more efficient vehicles that require fewer natural resources and generate less pollution.

Advancement in battery technology has made the dream of replacing internal combustion engines with electric motors a reality, reducing the consumption of liquid hydrocarbon fuels. Implementation of battery-powered EVs still faces stiff opposition as they carry a higher cost, still have limited range, and suffer weight parity issues when compared to traditional internal combustion vehicles. Further, the batteries of choice, Li-ion batteries, suffer from short cycle lives and exhibit significant degradation over time, making battery powered vehicles less attractive.

The cathode materials of most Li-ion batteries include transition metal compounds, oxides, or complex oxides. Such transition metal compounds have layered crystal structures (e.g., lithium cobalt oxide ($LiCoO_2$)), spinel crystal structures (e.g., lithium manganese oxide ($LiMn_2O_4$)), or olivine crystal structures (e.g., lithium iron phosphate ($LiFePO_4$)). The transition metal cations typically display four- and/or six-fold coordination with oxygen anions, anionic clusters, or ligands, classified into the full octahedron, full tetrahedron as well as octahedron/tetrahedron hybrid structures.

In operation, $Li^+$ ions are inserted via an electrochemical intercalation reaction. While $Li^+$ ions occupy the space between adjacent layers or unoccupied octahedral or tetrahedral sites, an equal number of electrons enter the available d orbitals of the transition metal cations in the host crystal. Essentially, the oxidation state of metal ions keeps change with the deinsertion accompanying the phase change of these compounds while the $Li^+$ ions remain in ionic state. These materials have some common characteristics: (1) chemical stability, (2) structural stability, and (3) channels allowing the effective diffusion of $Li^+$ ions within the solid oxides. The chemical stability of the cathode material ensures that the host of the cathode does not decompose during the delithiation process while structural stability allows the repeated deintercalation of $Li^+$ ions into the lattices of the host materials. Channels within the materials lead to the high-rate delithiation process within the materials, which in turn is essential for the high rate performance of Li-ion batteries.

The performance characteristics of various cathode materials are summarized in Table 1 below.

TABLE 1

| Cathode Type | | $LiMn_2O_4$ | $LiCoO_2$ | $LiFePO_4$ | $LiNi_xMn_yCo_zO_2$ (NMC) | $V_2O_5$ |
|---|---|---|---|---|---|---|
| Potential | Theoretical | 4.2 | 4.0 | 3.5 | 3.7 | 3.3 |
| (V vs Li/$Li^+$) | Practical | 4.0 | 3.8 | 3.3 | 3.5 | 2.7 |
| No. of $Li^+$ | Theoretical | 1 | 1 | 1 | 1 | 3 |
| Intercalated | Practical | 1 | 0.5 | 1 | 0.5 | 3 |
| Specific Capacity | Theoretical | 148 | 274 | 175 | 280 | 442 |
| (mAh/g) | Practical | 120 | 145 | 165 | 170 | 437 |
| Specific Energy | Theoretical | 622 | 1096 | 613 | 1036 | 1458 |
| (Wh/kg) | Practical | 480 | 551 | 545 | 595 | 1180 |
| Relative Cost ($/kg) | | 30 | 60 | 30 | 65 | 15 |

A particularly attractive cathode material for Li-ion batteries is vanadium pentoxide ($V_2O_5$), which has a high specific capacity with three $Li^+$ ion insertion and a high specific energy (See Table 1). Additionally, vanadium is quite abundant in nature, making its availability high and cost low (See Table 1). However, the practical applications of $V_2O_5$ have been limited due to: (1) low electrical conductivity, both intraparticle (i.e., within a $V_2O_5$ particle) and interparticle (i.e., between $V_2O_5$ particles), (2) slow $Li^+$ ion diffusion within $V_2O_5$, and (3) irreversible phase transitions upon deep discharge. Like most metal oxides, $V_2O_5$ has very low electronic conductivity due to its low d-band mobility. The lithiation and delithiation processes in crystalline $V_2O_5$ are accompanied by structural phase transitions. Such phase transition processes induce lattice strain due to phase coexistence within the same electrode particle, which can cause irreversible structural damage, thereby limiting the battery lifetime and causing irreversible capacity loss. Consequently, $V_2O_5$ has very poor rate capability and limited long-term cyclability. Efforts have been made to improve the electrical conductivity of $V_2O_5$, including coating $V_2O_5$ xerogel with conductive materials and using single-wall carbon nanotubes to form nanocomposites, doping metals, and organic polymers. Although these efforts have improved electrical conductivity to a certain degree, these efforts have not significantly improved the specific capacity, structural stability, and reversibility to the level of practical application.

For these reasons, there is a need for a cathode material for Li-ion batteries that takes advantage of the benefits of $V_2O_5$ while addressing its inherent drawbacks in a comprehensive manner.

SUMMARY

The present disclosure provides an improved nanocomposite cathode material for Li-ion batteries comprising $V_2O_5$ nanoribbons or substrates with a conductive matrix of graphene sheets and a network former such as silicon dioxide ($SiO_2$) and a method of making the same.

According to an embodiment of the present disclosure, an electrode material is provided including a conductive matrix including a plurality of graphene sheets, a plurality of vanadium pentoxide substrates coupled to the conductive matrix, and a silicon dioxide network formed between the plurality of vanadium pentoxide substrates.

According to another embodiment of the present disclosure, a battery is provided including an electrode, the electrode including a plurality of graphene sheets, a plurality of vanadium pentoxide substrates coupled to the plurality of graphene sheets, and a silicon dioxide network formed between the plurality of vanadium pentoxide substrates.

According to yet another embodiment of the present disclosure, a method is provided for making an electrode material, the method including: preparing a solution containing a vanadium oxide and a silicon oxide; subjecting the solution to ion exchange; adding graphene oxide to the solution; aging the solution to produce a hydrogel; drying the hydrogel to produce a xerogel; and heating the xerogel to reduce the graphene oxide to graphene and produce a $V_2O_5$—$SiO_2$/Graphene material.

BRIEF DESCRIPTION OF THE DRAWINGS

The above-mentioned and other features and advantages of this disclosure, and the manner of attaining them, will become more apparent and will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION

Figure 1:
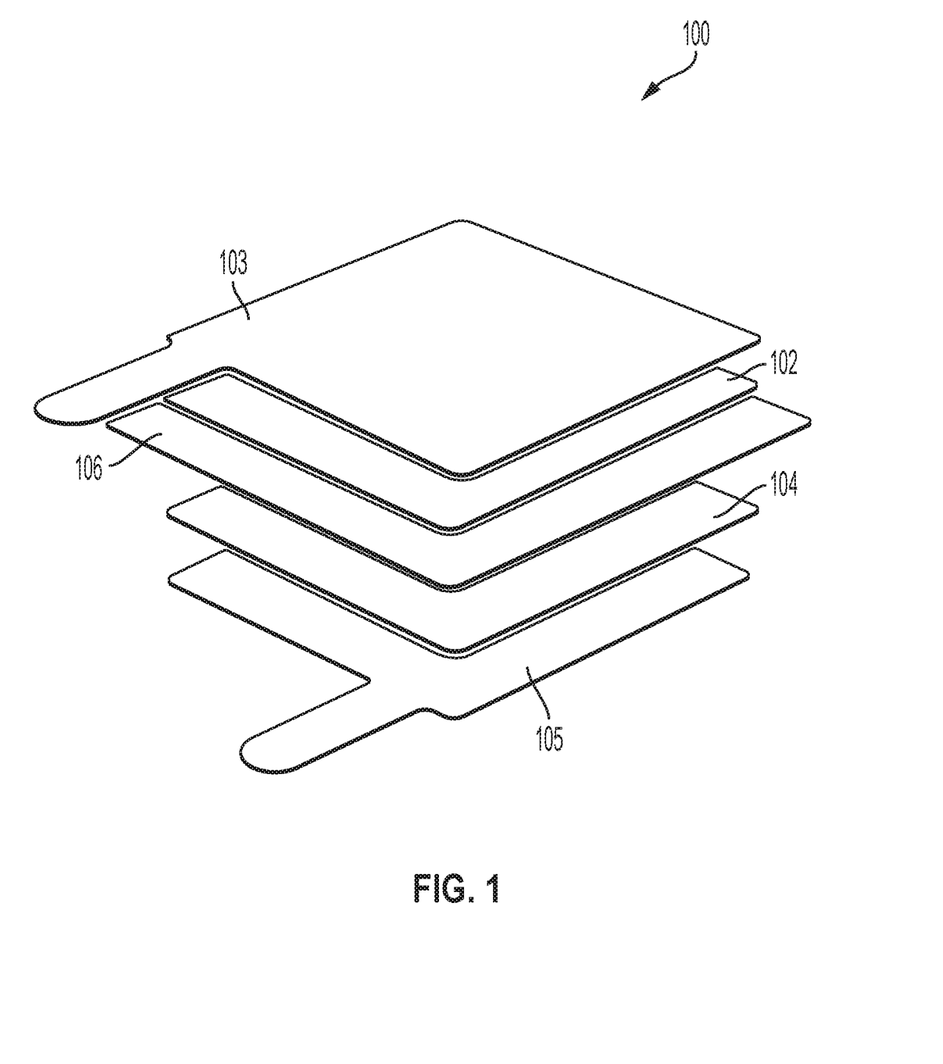
FIG. 1 is a schematic view of a Li-ion battery of the present disclosure.

FIG. 1 provides a Li-ion battery 100 including an anode 102 coupled to an anode current collector 103, a cathode 104 coupled to a cathode current collector 105, and an electrolyte-filled separator 106. In one particular example, the anode 102 comprises Li metal and the electrolyte comprises a solution of $LiPF_6$ in a mixture of ethylene carbonate (EC) and ethyl methyl carbonate (EMC), but sulfone-based, ionic liquid-based, nitrile-based, or other electrolytes can also be used. The illustrative battery 100 is a pouch cell, but the battery 100 may also be a cylindrical cell, a coin cell, or a prismatic cell, for example. The battery 100 may be configured for use in a portable electronic device, an electric vehicle, an energy storage device, or other electronic devices.

Figure 2:
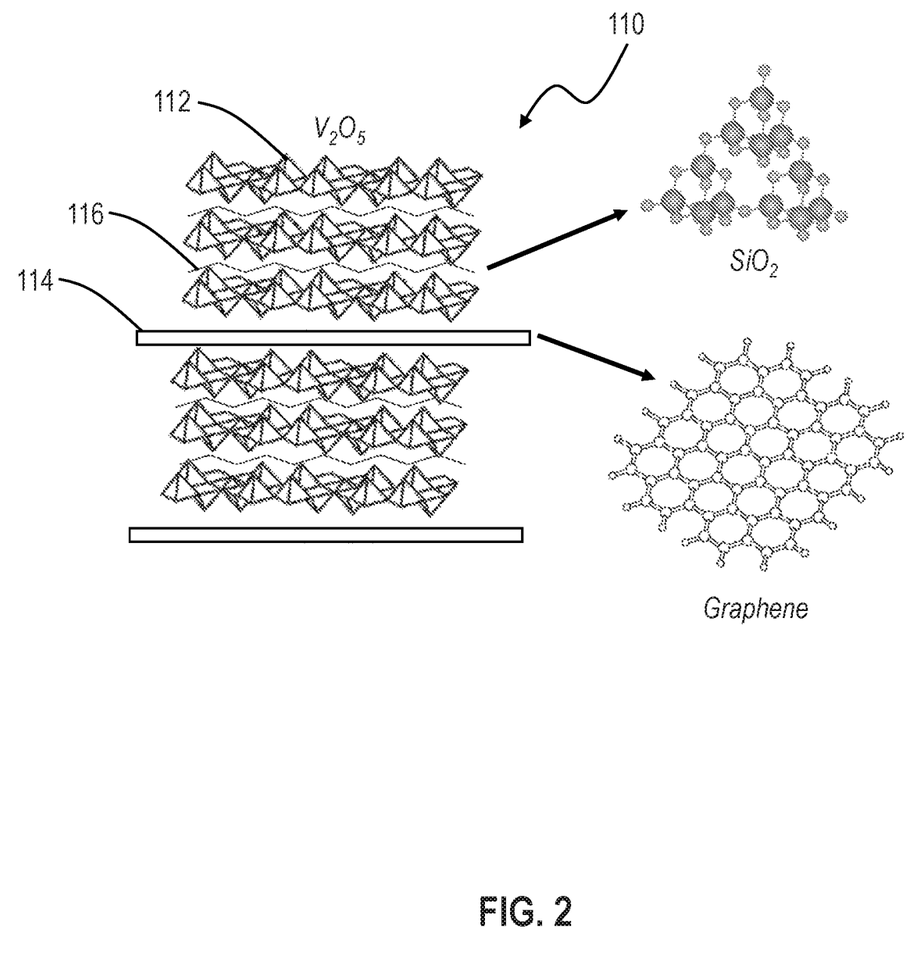
FIG. 2 is a schematic view of an exemplary $V_2O_5$—$SiO_2$/Graphene nanocomposite material of the present disclosure.

FIG. 2 provides an improved nanocomposite cathode material 110 for cathode 104 of battery 100 (FIG. 1) comprising a modified $V_2O_5$. More specifically, the nanocomposite cathode material 110 includes $V_2O_5$ nano-ribbon/substrates 112 with a conductive matrix of graphene sheets 114 and a network former such as silicon dioxide ($SiO_2$) 116, which may be referred to herein as a $V_2O_5$—$SiO_2$/Graphene nanocomposite material. The nanocomposite cathode material 110 may have an initial specific energy of 600 Wh/kg or more. The nanocomposite cathode material 110 may also lack cobalt.

The graphene sheets 114 may improve the electrical conductivity of the nanocomposite cathode material 110 compared to the $V_2O_5$ nano-ribbon/substrates 112 alone. Additionally, the graphene sheets 114 may provide a structural matrix to anchor and stabilize the $V_2O_5$ nano-ribbon/substrates 112 and reduce volume change stress during charge/discharge cycling. As shown in FIG. 2, each graphene sheet 114 includes a single-layer of graphene with $sp^2$-bonded carbon atoms arranged in a honeycomb crystal structure and can be viewed as an individual atomic plane of a graphite structure. Each carbon atom in the graphene uses 3 of its 4-valance band (2s, 2p) electrons (which occupy the $sp^2$ orbits) to form 3 covalent bonds with the neighboring carbon atoms in the same plane. Each carbon atom in the graphene contributes its fourth lone electron (occupying the $p_z$ orbit) to form a delocalized electron system, a long-range x-conjugation system shared by all carbon atoms in the graphene plane. Such a long-range x-conjugation in graphene yields extraordinary electrical, mechanical, and thermal properties in the cathode material 110. The nanocomposite cathode material 110 exhibits improved intraparticle electronic conduction because of good electrical conductivity of graphene, and $Li^+$ ion diffusion is improved because diffusion length is shortened. Furthermore, the formed smaller $V_2O_5$ grain size in the nanocomposite cathode material 110 reduces the stress within particles, leading to better structure stability and cycle life. According to an exemplary embodiment of the present disclosure, the nanocomposite cathode material 110 may comprise about 1 wt. % to about 10 wt. % graphene, more specifically about 1 wt. % to about 5 wt. % graphene, more specifically about 2 wt. % graphene. The graphene content should be sufficiently low to maintain the graphene as single sheets and avoid re-stacking. Additional information regarding the incorporation of graphene sheets 114 is disclosed in U.S. Publication No. 2015/0380732, the disclosure of which is expressly incorporated herein by reference in its entirety.

In certain embodiments, the graphene sheets 114 may be modified with one or more functional groups (e.g., —OH, —COOH, —NH$_3$). For example, the functional groups may be covalently grafted onto the surface of the graphene sheets 114 through diazonium salt via a diazonium reaction. The diazonium reaction-based functionalization may provide a simple and cost-effective way to transform the pure graphene sheets 114 into hierarchical and functional materials that can provide the desired properties (i.e. hydrophobicity, Li$^+$/e$^-$ conductivity, Li$^+$ diffusivity, nanoparticle dispersion, local electric field, etc.) to enhance binding with the adjacent V$_2$O$_5$ nano-ribbon/substrates 112.

The SiO$_2$ network 116 may enhance the structural stability, capacity, and cyclability and improve Li$^+$ ion diffusion within the nanocomposite cathode material 110 compared to V$_2$O$_5$ nano-ribbon/substrates 112 alone and/or V$_2$O$_5$ nano-ribbon/substrates 112 with graphene sheets 114. In certain embodiments, the nanocomposite cathode material 110 with the SiO$_2$ network 116 may have an initial capacity above 390 mAh/g at 0.1 C and above 310 mAh/g at 1 C. The nanocomposite cathode material 110 with the SiO$_2$ network 116 may maintain a capacity above 300 mAh/g after 500 cycles or more. Also, the nanocomposite cathode material 110 with the SiO$_2$ network 116 may have an initial specific energy above 910 Wh/kg at 0.1 C and above 630 Wh/kg at 1 C. According to an exemplary embodiment of the present disclosure, the nanocomposite cathode material 110 may comprise about 5 wt. % to about 25 wt. % SiO$_2$, more specifically about 10 wt. % to about 20 wt. % SiO$_2$, more specifically about 15 wt. % SiO$_2$.

Figure 3:
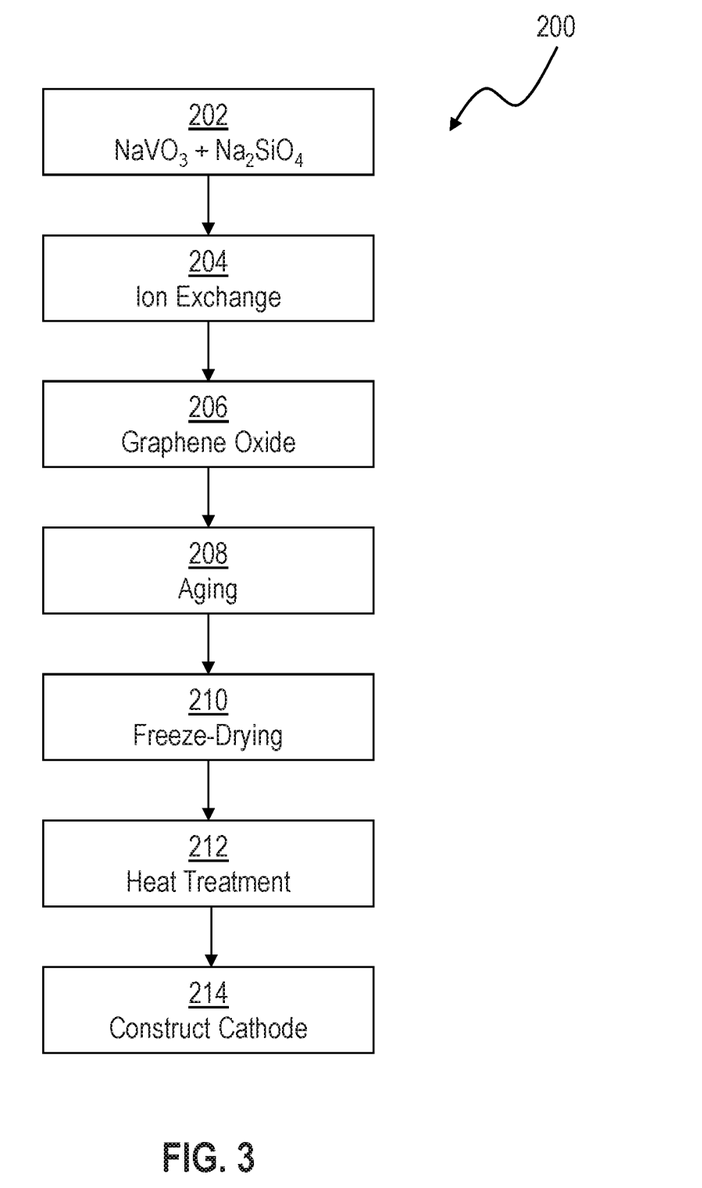
FIG. 3 is a flow chart illustrating an exemplary method for preparing the $V_2O_5$—$SiO_2$/Graphene material.

FIG. 3 provides an exemplary method 200 for synthesizing the V$_2$O$_5$—SiO$_2$/Graphene material 110 (FIG. 2) and constructing the cathode 104 (FIG. 1). The method 200 may involve an ion exchange, sol-gel, freeze-drying or spray-drying process.

In step 202, a solution of a vanadium oxide, specifically sodium metavanadate (NaVO$_3$), and a silicon oxide, specifically sodium silicate (Na$_2$SiO$_4$), is prepared. The solution may contain about 75 wt. % to about 95 wt. % NaVO$_3$ and about 5 wt. % to about 25 wt. % Na$_2$SiO$_4$ in a suitable solvent, such as deionized (DI) water.

In step 204, the prepared solution from preparing step 202 is subjected to ion exchange to produce a pale-yellow solution of metavanadic acid (HVO$_3$) and metasilicic acid (H$_2$SiO$_3$). The ion exchange step 204 may involve eluting the prepared solution through a column loaded with a proton-exchange resin at about 50 mesh to about 100 mesh, for example. Following ion exchange, the dilute HVO$_3$ solution may gradually start to form V$_2$O$_5$ hydrogel via protonation, usually within several minutes.

In step 206, a graphene oxide (GO) solution is added to the ion-exchanged solution from step 204. The GO solution may be prepared using a modified Hummer's method, as disclosed in Example 1 below, for example. The resulting solution may be dark yellow in color and may contain GO, V$_2$O$_5$ hydrogel, and H$_2$SiO$_4$ in the solvent.

In step 208, the solution from step 206 is aged in a glass container to obtain a mature homogeneous V$_2$O$_5$ hydrogel on the GO sheets. The duration of the aging step 208 may be about 1 week, 2 weeks, 3 weeks, or more. Throughout the aging process, the solution may continue to change color from dark yellow, to dark brown, to dark red as V$_2$O$_5$ ribbons 112 (FIG. 2) grow on the surface of the GO sheets. Without wishing to be bound by theory, the formation of V$_2$O$_5$ ribbons 112 during the aging step 208 may be accompanied by the formation and growth of a SiO$_2$ network, thereby forming a V$_2$O$_5$—SiO$_2$ hydrogel.

In step 210, the hydrogel is freeze-dried under in an inert environment (e.g., N$_2$) or under a vacuum to obtain a V$_2$O$_5$—SiO$_2$ xerogel.

In step 212, the V$_2$O$_5$—SiO$_2$ xerogel is heat treated in an oven to remove any excess water and to obtain final V$_2$O$_5$—SiO$_2$/Graphene material 110 (FIG. 2), in which the GO is reduced to graphene. The temperature of the heating step 212 may be about 300° C. to about 400° C., more specifically about 325° C. to about 375° C., more specifically about 350° C. The hydrogel or xerogel may be heated to the desired temperature at a rate of about 5° C./minute, for example, and then held at the desired temperature for about 30 minutes to about 2 hours, more specifically about 1 hour, for example. When the water is partially removed, the graphene sheets 114 may act as spacers to create gaps between the formed V$_2$O$_5$ nanoribbons 112, as shown in FIG. 2.

In step 214, the cathode 104 (FIG. 1) is constructed using the V$_2$O$_5$—SiO$_2$/Graphene material from the heating step 212. The constructing step 214 may involve preparing a slurry. In one example, the slurry contains about 80 wt. % V$_2$O$_5$—SiO$_2$/Graphene material, about 10 wt. % polyvinylidence difluoride (PVDF), and about 10 wt. % carbon black. Next, the slurry may be sprayed onto or otherwise applied to the cathode current collector 105, such as a 10 μm thick aluminum (Al) foil. Then, the cathode 104 may be dried in a vacuum oven, such as at a temperature of about 90° C. and a duration of about 24 hours.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

Examples

1. Preparation of GO Solution

A GO solution was prepared using a modified Hummer's method. 2 grams of graphite flakes were mixed with 10 mL of concentrated H$_2$SO$_4$, 2 grams of (NH$_4$)$_2$S$_2$O$_8$, and 2 grams of P$_2$O$_5$. The obtained mixture was heated at 80° C. for 4 hours under constant stirring. Then the mixture was filtered and washed thoroughly with DI water. After drying in an oven at 80° C. overnight, this pre-oxidized graphite was then subjected to oxidation using the Hummer's method. 2 grams of pre-oxidized graphite, 1 gram of sodium nitrate and 46 mL of sulfuric acid were mixed and stirred for 15 minutes in an iced bath. Then, 6 grams of potassium permanganate was slowly added to the obtained suspension solution for another 15 minutes. After that, 92 mL DI water was slowly added to the suspension, while the temperature was kept constant at about 98° C. for 15 minutes. After the suspension has been diluted by 280 mL DI water, 10 mL of 30% H$_2$O$_2$ was added to reduce the unreacted permanganate. Finally, the resulted suspension was centrifuged several times to remove the unreacted acids and salts. The purified GO were dispersed in DI water to form a 0.2 mg/mL solution by sonication for 1 hour. Then the GO dispersion was subjected to another centrifugation in order remove the un-exfoliated GO. The resulted GO dilute solution could remain in a very stable suspension without any precipitation for a few months.

2. Preparation of $V_2O_5$ Electrodes

Various $V_2O_5$ materials were prepared according to Table 2 below.

TABLE 2

| Material | $V_2O_5$ (wt. %) | $SiO_2$ (wt. %) | Graphene (wt. %) |
|---|---|---|---|
| Pure $V_2O_5$ | 100 | — | — |
| $V_2O_5$-$SiO_2$ | 90 | 10 | — |
| $V_2O_5$-$SiO_2$/Graphene* | 88 | 10 | 2 |

*Prepared using GO from Example 1

Following ion exchange, each solution was aged in a glass container for three weeks. Then, each solution was freeze-dried under vacuum, heated and annealed under $N_2$ at a rate of 5° C./minute up to 400° C., and kept constant at 400° C. for two hours. Next, each solution was slurried with 10 wt. % PVDF and 10 wt. % carbon black, sprayed onto a 10 μm thick Al foil, placed in a vacuum oven, and allowed to dry at 90° C. for 24 hours. The resulting cathodes were assembled into R2016 coin cells using Li metal anodes and dielectric separators with electrolytes including 1.2 M $LiPF_6$ in a 3:7 by weight solvent mixture of EC and EMC.

3. Electrochemical Performance of $V_2O_5$ Electrodes

Figure 4:
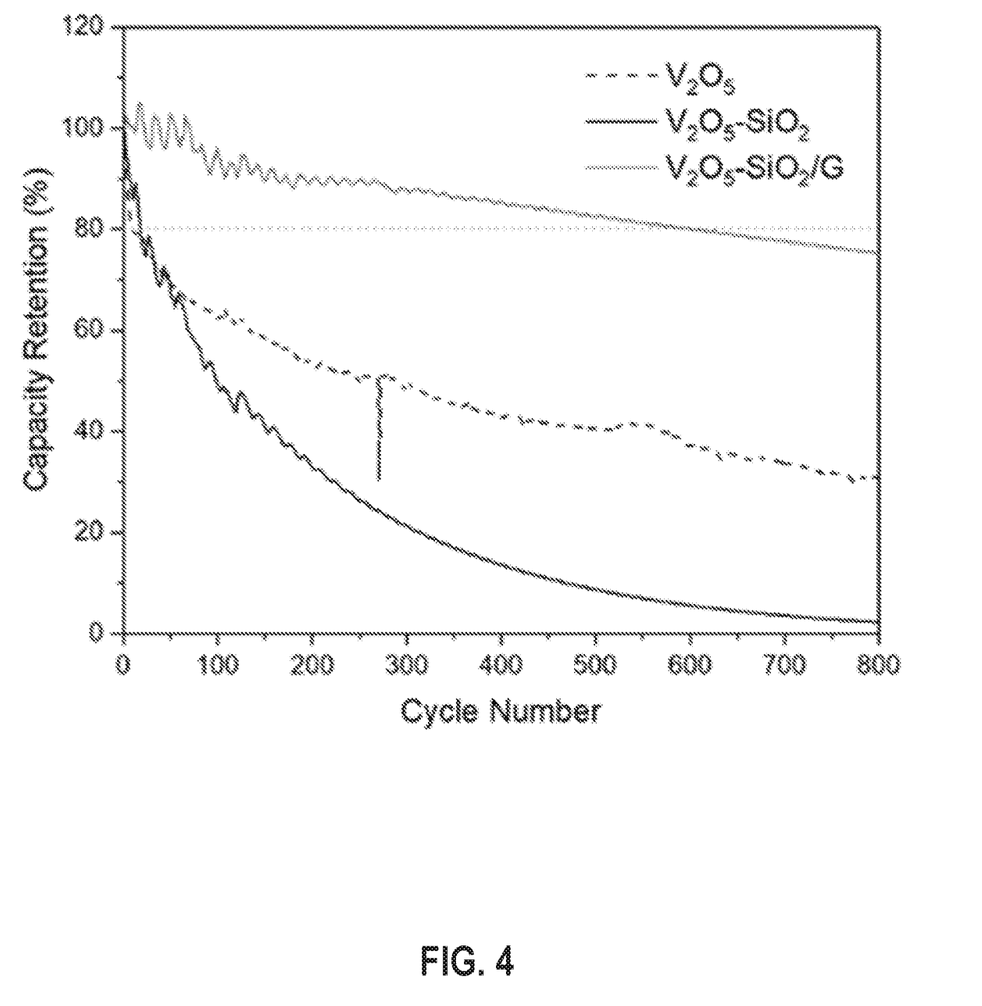
FIG. 4 graphically illustrates cycle performance of various $V_2O_5$ materials.
Figure 5:
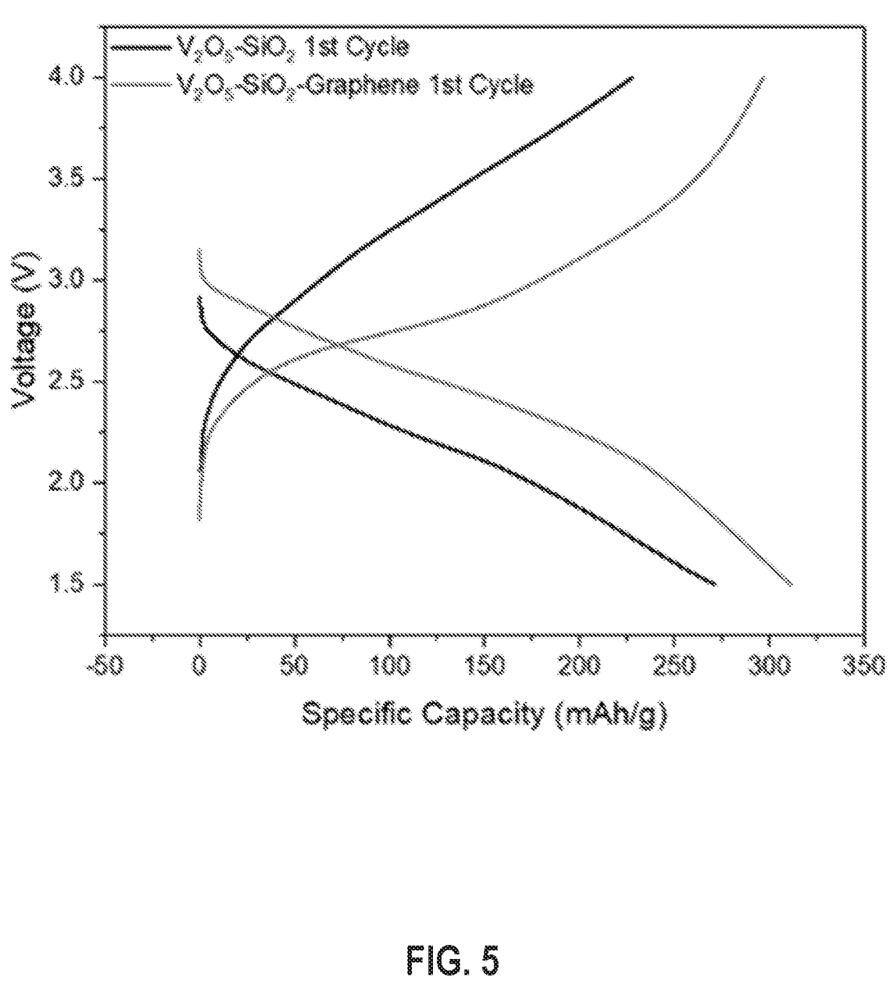
FIG. 5 graphically illustrates charge/discharge curves for various $V_2O_5$ materials for a $1^{st}$ cycle at 1C.
Figure 6:
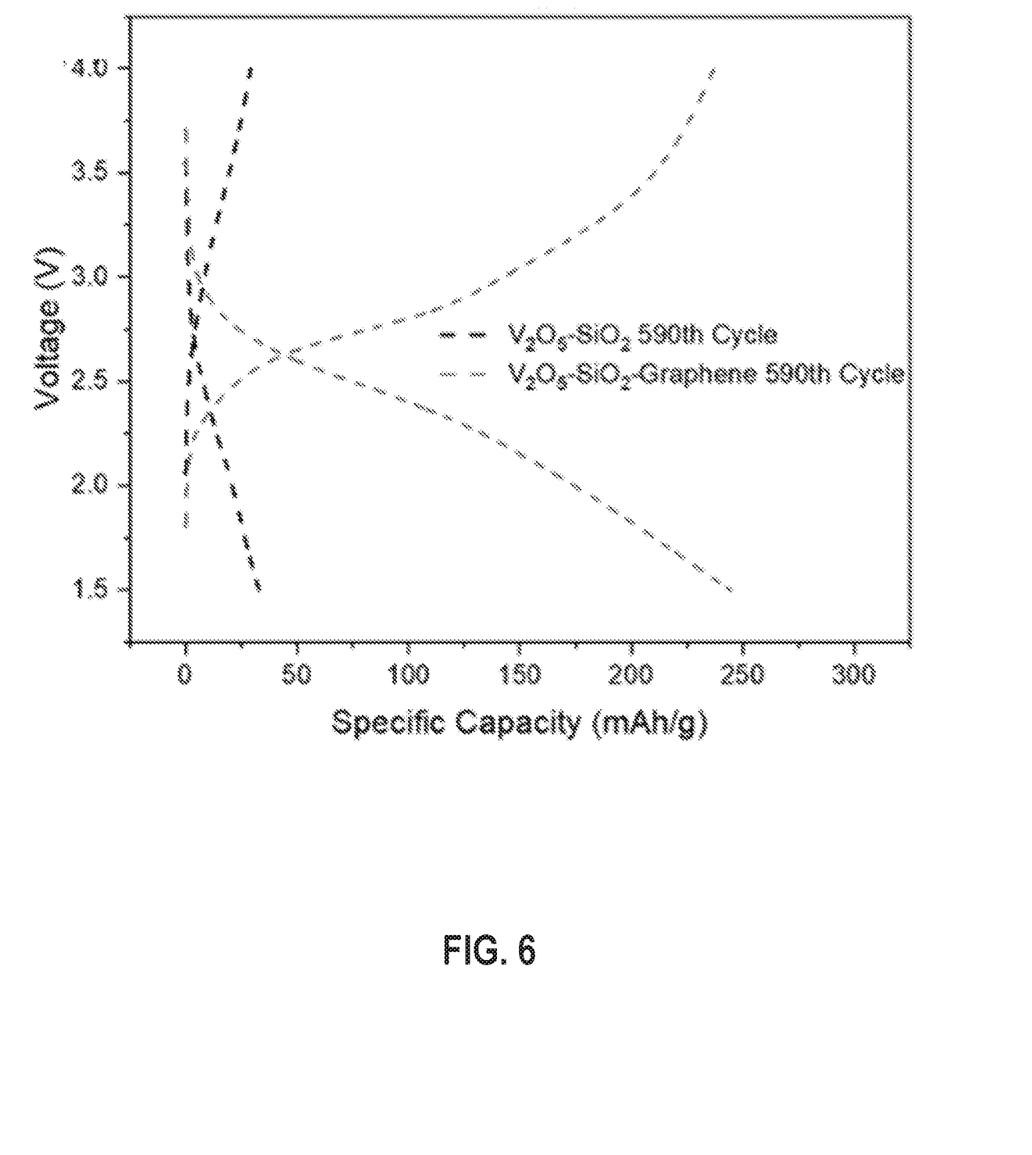
FIG. 6 graphically illustrates charge/discharge curves for various $V_2O_5$ materials for a $590^{th}$ cycle.

The cells were subjected to cycle testing with a battery cycler using different C-rates between 1.7 V and 3.6 V. The cycling performance results are presented in Table 3 below and are shown graphically in FIGS. 4-6. At 0.1 C rate, the $V_2O_5$—$SiO_2$/Graphene nanocomposite electrode delivered a first discharge capacity around 400 mAh/g (corresponding to 959 Wh/kg) and maintained a capacity above 300 mAh/g after 589 cycles (corresponding to 719 Wh/kg). Even at a higher 1 C rate, the $V_2O_5$—$SiO_2$/Graphene nanocomposite electrode still delivered 317 mAh/g (corresponding to 798 Wh/kg). Without graphene, the $V_2O_5$—$SiO_2$ electrode only delivered 290.2 mAh/g (corresponding to 628 Wh/kg). Without graphene and $SiO_2$, the pure $V_2O_5$ electrode only delivered 137.4 mAh/g (corresponding to 299.3 Wh/kg).

TABLE 3

| Material | Initial Specific Capacity (mAh/g) (0.1 C) | Initial Specific Energy (Wh/kg) (0.1 C) | Initial Specific Capacity (mAh/g) (1 C) | Initial Specific Energy (Wh/kg) (1 C) | Cycle Life (1 C) |
|---|---|---|---|---|---|
| Pure $V_2O_5$ | 324.2 | 778.1 | 137.4 | 299.3 | 11 |
| $V_2O_5$-$SiO_2$ | 376.5 | 903.6 | 290.2 | 628.7 | 20 |
| $V_2O_5$-$SiO_2$/Graphene | 392.3 | 941.5 | 317.6 | 792.5 | 589 |

Figure 7:
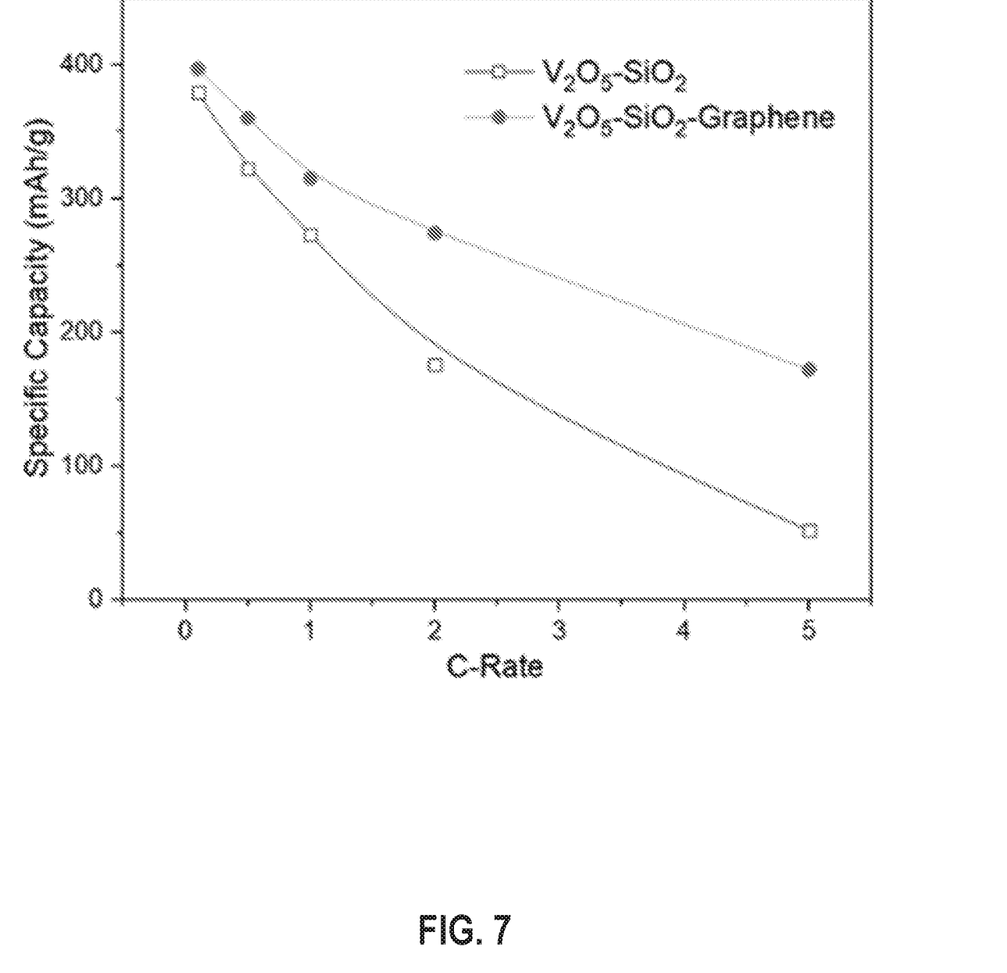
FIG. 7 graphically illustrates rate performance for various $V_2O_5$ materials based on C-rate.

The rate performance results are presented in Table 4 below and are shown graphically in FIG. 7. Even at elevated current densities, the $V_2O_5$—$SiO_2$/Graphene electrode retains a higher $Li^+$ ion storage capacity compared to $V_2O_5$—$SiO_2$ without graphene. Thus, graphene contributes to a specific capacity increase of 4.8%, 11.7%, 15.4%, 55.9%, and 231.2% at different rates. The trend continued at even higher rates (10 C), which suggests a significant increase in electric conductivity, both interparticle and intraparticle, due to the presence of $SiO_2$ and graphene.

TABLE 4

| Material | 0.1 C | 0.5 C | 1 C | 2 C | 5 C |
|---|---|---|---|---|---|
| $V_2O_5$-$SiO_2$ | 379.2 | 322.1 | 273.4 | 175.8 | 51.9 |
| $V_2O_5$-$SiO_2$/Graphene | 397.4 | 359.7 | 315.4 | 274.1 | 171.9 |
| Capacity Increase (%) | 4.8 | 11.7 | 15.4 | 55.9 | 231.2 |

Figure 8:
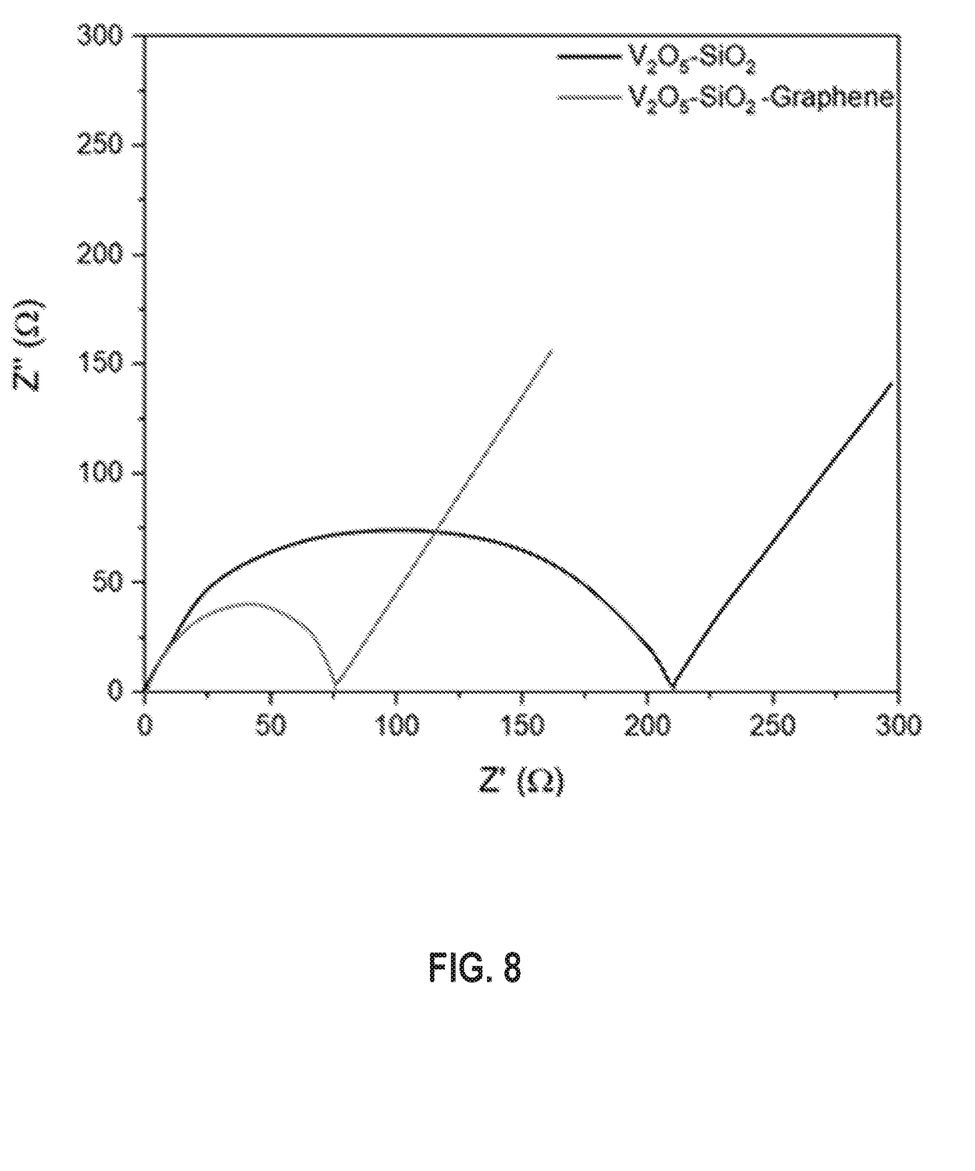
FIG. 8 graphically illustrates electrochemical impedance spectroscopy for various $V_2O_5$ materials.

The cells were subjected to AC impedance testing measured in the frequency range of 0.01 Hz-1 MHz with an amplitude of 5 mV. The AC impedance results are presented in Table 5 below and are shown graphically in FIG. 8, where $R_0$ is the contact resistance, $R_e$ is the electrode resistance, $R_{SEI}$ is the resistance of solid electrolyte interphase (SEI), $R_{ct}$ is the charge-transfer resistance of the redox reaction of the vanadium in $V_2O_5$, $C_{dl}$ is the double-layer electrode capacitance, and $W_d$ is the Warburg diffusion impedance, which may reflect the diffusion of $Li^+$ ions in the $V_2O_5$. The graphene in the $V_2O_5$ caused the significant change in the electric conductivity. $R_0$ decreased by 50% with the addition of graphene, from 3.65Ω in the $V_2O_5$—$SiO_2$ to 1.57Ω in the $V_2O_5$—$SiO_2$/Graphene. Rat also decreased significantly with the addition of graphene, from 189Ω in the $V_2O_5$—$SiO_2$ to 70.9Ω in the $V_2O_5$—$SiO_2$/Graphene, which also explains the increased rate performance. $W_d$ decreased significantly with the addition of graphene, from 13.56 in the $V_2O_5$—$SiO_2$ (corresponding to a $Li^+$ ion diffusion coefficient of $1.55 \times 10^{-14}$) to 0.775 in the $V_2O_5$—$SiO_2$/Graphene (corresponding to a $Li^+$ ion diffusion coefficient of $1.86 \times 10^{-12}$), or a two order of magnitude increase.

TABLE 5

| Material | $R_0$ | $R_{SEI}$ | $R_{ct}$ | $W_d$ |
|---|---|---|---|---|
| $V_2O_5$ | 309 | | 46.8 | 0.45 |
| $V_2O_5$/Graphene | 86.5 | | 10.9 | 0.4 |
| $V_2O_5$-$SiO_2$ | 3.65 | 19.8 | 189 | 13.56 |
| $V_2O_5$-$SiO_2$/Graphene | 1.57 | 6.58 | 70.9 | 0.775 |

Figure 9:
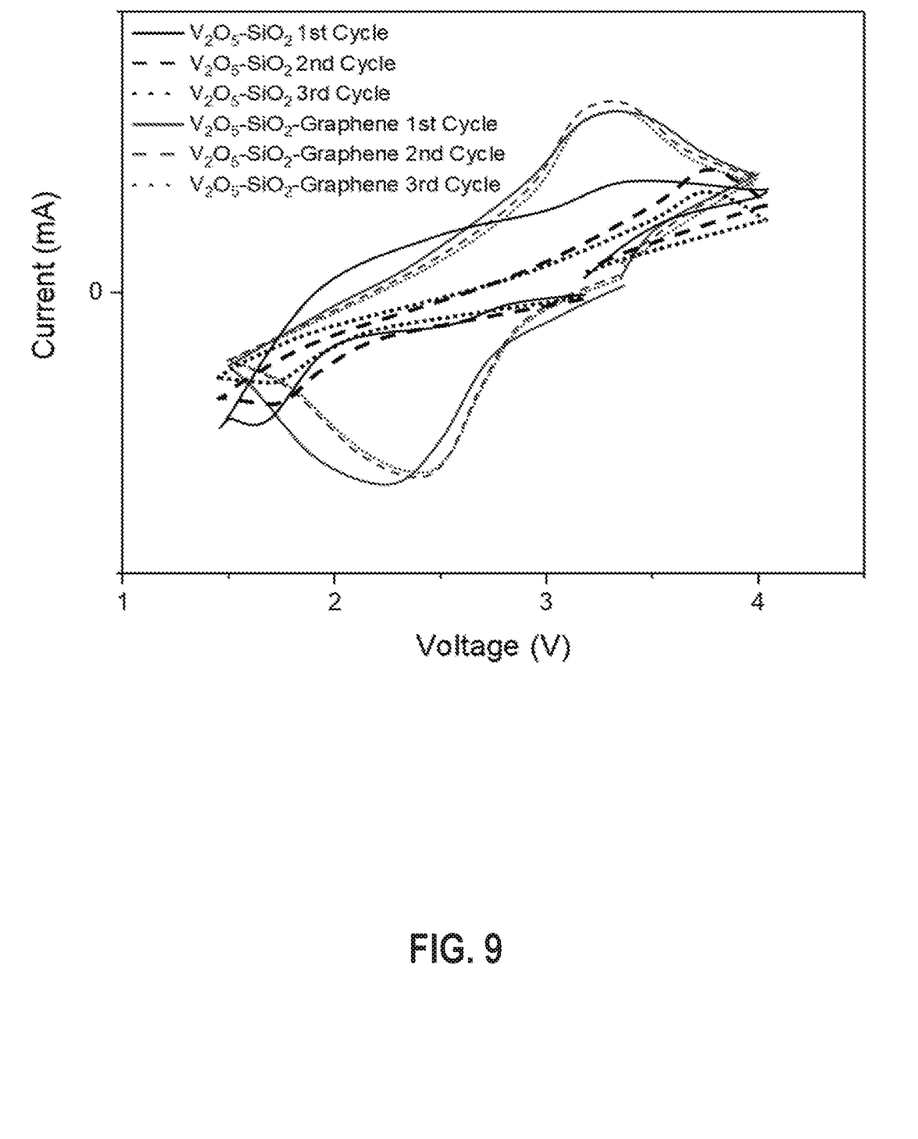
FIG. 9 graphically illustrates cyclic voltammetry curves for various $V_2O_5$ materials.

The cells were subjected to cyclic voltammetry (CV) testing in the range of 1.5 V to 4.0 V at a scan rate of 0.5 mV/s. The CV curves are shown in FIG. 9. In the case of the $V_2O_5$—$SiO_2$ electrode, two cathodic peaks are observed: a very weak peak at about 2.5 V and another peak at about 1.7 V, corresponding to the lithiation of the $V_2O_5$—$SiO_2$ electrode. In the positive scan, two peaks at 2.5 and 3.4 V was observed, corresponding to the (de)lithiation of $V_2O_5$—$SiO_2$. However, after the first CV cycle, the peaks disappeared, and the capacity (CV curve area) dropped to less than half of the initial ones. In the case of the $V_2O_5$—$SiO_2$/Graphene electrode, a broad redox peak can be observed at 2.4 V and 3.3 V corresponding to the $Li^+$ insertion/deinsertion into $V_2O_5$—$SiO_2$. Broad reversible redox peaks suggest that $V_2O_5$—$SiO_2$/Graphene remains stable during the $Li^+$ insertion/extraction process and the lithiation and dilithiation process is reversible, suggesting a good cycle life. CV properties of $V_2O_5$—$SiO_2$ and $V_2O_5$—$SiO_2$/Graphene prove that it is possible to use $SiO_2$ as a network former to form more stable 3-d network and improve the structure/performance stability consequently.

What is claimed is:

1. An electrode material containing a $V_2O_2$—$SiO_2$/Graphene material comprising:
    a conductive matrix comprising a plurality of graphene sheets;
    a plurality of vanadium pentoxide substrates coupled to the conductive matrix, multiple substrates of the vanadium pentoxide substrates being disposed between an adjacent pair of the plurality of the graphene sheets; and a network former of silicon dioxide disposed between at least one adjacent pair of the multiple substrates of the plurality of vanadium pentoxide substrates.

2. The electrode material of claim 1, wherein the $V_2O_5$—$SiO_2$/Graphene material comprises about 1 wt. % to about 10 wt. % of the graphene sheets.

3. The electrode material of claim 2, wherein the $V_2O_5$—$SiO_2$/Graphene material comprises about 2 wt. % of the graphene sheets.

4. The electrode material of claim 1, wherein the $V_2O_5$—$SiO_2$/Graphene material comprises about 5 wt. % to about 25 wt. % of the network former of the silicon dioxide.

5. The electrode material of claim 1, wherein the electrode material has an initial capacity above 390 mAh/g at 0.1 C.

6. The electrode material of claim 1, wherein the electrode material has an initial capacity above 310 mAh/g at 1 C.

7. The electrode material of claim 1, wherein the electrode material has an initial specific energy above 910 Wh/kg at 0.1 C.

8. The electrode material of claim 1, wherein the electrode material has an initial specific energy above 630 Wh/kg at 1 C.

9. The electrode material of claim 1, wherein the plurality of graphene sheets include a first graphene sheet and a second graphene sheet, the plurality of vanadium pentoxide substrates being disposed between the first and second graphene sheets.

10. The electrode material of claim 9, wherein the plurality of vanadium pentoxide substrates include a first vanadium pentoxide substrate and a second vanadium pentoxide substrate, the $V_2O_5$—$SiO_2$/Graphene material comprises a plurality of the network former of silicon dioxide, at least a first of the plurality of the network former of the silicon dioxide being disposed between the first vanadium pentoxide substrate and the first graphene sheet and at least a second of the plurality of the network former of the silicon dioxide network being disposed between the second vanadium pentoxide substrate and the second graphene sheet.

11. A battery comprising an electrode with the electrode material of claim 1.

12. The battery of claim 11, wherein the battery is configured for use in a portable electronic device, an electric vehicle, or an energy storage device.

13. The battery of claim 11, wherein the electrode comprises:
80 wt. % of the $V_2O_5$—$SiO_2$/Graphene material of claim 1;
10 wt. % polyvinylidene difluoride; and
10 wt. % carbon black.

14. The battery of claim 11, further comprising:
a Li-metal anode; and
a dielectric separator.

15. A method of making an electrode material comprising:
preparing a solution containing a vanadium oxide and a silicon oxide;
subjecting the solution to ion exchange;
adding graphene oxide to the solution;
aging the solution to produce a hydrogel;
drying the hydrogel to produce a xerogel; and
heating the xerogel to reduce the graphene oxide to graphene and produce a $V_2O_5$—$SiO_2$/Graphene material.

16. The method of claim 15, wherein the vanadium oxide of the preparing step is sodium metavanadate ($NaVO_3$), and the silicon oxide of the preparing step is sodium silicate ($Na_2SiO_4$).

17. The method of claim 16, wherein the subjecting step produces metavanadic acid ($HVO_3$) and metasilicic acid ($H_2SiO_3$).

18. The method of claim 15, wherein the hydrogel of the aging step is a $V_2O_5$ hydrogel.

19. The method of claim 15, wherein the hydrogel of the aging step is a $V_2O_5$—$SiO_2$ hydrogel.

20. The method of claim 15, further comprising constructing a cathode with the $V_2O_5$—$SiO_2$/Graphene material.

* * * * *